United States Patent
Flores Assad et al.

(10) Patent No.: US 9,164,568 B2
(45) Date of Patent: Oct. 20, 2015

(54) ESTIMATING AND PRESERVING BATTERY LIFE BASED ON USAGE PATTERNS

(71) Applicant: Microsoft Corporation, Redmond, WA (US)

(72) Inventors: Javier N. Flores Assad, Bothell, WA (US); Maher Afif Saba, Seattle, WA (US); Pantelis Apostolopoulos, Kirkland, WA (US); Daniel Guilherme Paixao Deschamps, Redmond, WA (US); Iulian D. Calinov, Sammamish, WA (US); Wanittha Thapanakul, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/300,062

(22) Filed: Jun. 9, 2014

(65) Prior Publication Data
US 2014/0289543 A1 Sep. 25, 2014

Related U.S. Application Data

(63) Continuation of application No. 13/154,467, filed on Jun. 7, 2011, now Pat. No. 8,751,845.

(51) Int. Cl.
*G06F 1/32* (2006.01)
(52) U.S. Cl.
CPC .............. *G06F 1/3212* (2013.01); *G06F 1/325* (2013.01); *Y02B 60/1292* (2013.01)
(58) Field of Classification Search
CPC .... G06F 1/3212; G06F 1/325; Y02B 60/1292
See application file for complete search history.

(56) References Cited

U.S. PATENT DOCUMENTS

| | | | |
|---|---|---|---|
| 5,799,256 A | 8/1998 | Pombo et al. |
| 6,710,578 B1 | 3/2004 | Sklovsky |
| 7,221,939 B2 | 5/2007 | Ylitalo et al. |
| 7,505,795 B1 | 3/2009 | Lim et al. |
| 7,539,994 B2 | 5/2009 | McAlinden et al. |

(Continued)

OTHER PUBLICATIONS

Vin, Jae, "6 Easy Tweaks to Boost Your Android Phone's Battery Life", Retrieved at <<http://jaevin.com/blog/2011/02/22/extend-boost-android-battery-life/>>, Feb. 22, 2011, pp. 1-4.

(Continued)

*Primary Examiner* — M Elamin
(74) *Attorney, Agent, or Firm* — John Jardine; Kate Drakos; Micky Minhas

(57) ABSTRACT

Embodiments apply user-specific usage patterns to estimate and preserve remaining battery life on a computing device. An amount of battery drain and an execution context are determined and stored for a plurality of recurring time periods. The execution context identifies operations executed by the computing device, signal strength, and other data describing the associated time period. If one of the operations is expected to be executed during a recurrence of at least one of the time periods, the expected execution is adjusted based on execution context and an estimated remaining battery life for the computing device. For example, the computing device may postpone or reschedule the operation for a time period during which the operation is expected to have a greater likelihood of completing successfully. In some embodiments, the battery preservation operations are automatically enabled at a particular threshold.

20 Claims, 10 Drawing Sheets

(56) References Cited

U.S. PATENT DOCUMENTS

| | | |
|---|---|---|
| 7,706,772 B2 | 4/2010 | Malcolm |
| 7,925,136 B2 * | 4/2011 | Balatsos et al. ............... 386/224 |
| 8,588,870 B1 * | 11/2013 | Vargantwar .................. 455/574 |
| 2005/0108075 A1 | 5/2005 | Douglis et al. |
| 2007/0120959 A1 | 5/2007 | Wu et al. |
| 2007/0252552 A1 | 11/2007 | Walrath |
| 2007/0274545 A1 * | 11/2007 | Nakaya et al. ................ 381/191 |
| 2010/0178900 A1 | 7/2010 | Cheng et al. |
| 2011/0037436 A1 | 2/2011 | Seethaler et al. |
| 2011/0080422 A1 | 4/2011 | Lee et al. |
| 2012/0317432 A1 | 12/2012 | Assad et al. |

OTHER PUBLICATIONS

"Extend Android Battery Life", Retrieved at <<http://www.taranfx.com/extend-android-battery-life>>, Oct. 23, 2010, pp. 1-8.

"Non-Final Office Action for U.S. Appl. No. 13/154,467", Mailed Date: Mar. 15, 2013, 5 pages.

"Non-Final Office Action for U.S. Appl. No. 13/154,467", Mailed Date: Jul. 25, 2013, 6 pages.

"Notice of Allowance for U.S. Appl. No. 13/154,467", Mailed Date: Jan. 29, 2014, 5 pages.

\* cited by examiner

ESTIMATING AND PRESERVING BATTERY LIFE BASED ON USAGE PATTERNS

This application is a continuation of U.S. application Ser. No. 13/154,467, filed Jun. 7, 2011, now U.S. Pat. No. 8,751,845, the entirety of which is hereby incorporated by reference herein.

BACKGROUND

Some existing systems calculate remaining battery life for a device based on benchmarks or other hardcoded data calculated by the device manufacturer and/or the battery manufacturer. These benchmarks are applied to all users in all environments. At least because battery usage varies per user and per environment, the estimates of remaining battery life generated by these existing systems can be very inaccurate. Other existing systems obtain an instantaneous battery discharge value (e.g., over one second) for use in estimating remaining battery life. Because the instantaneous battery discharge value may not reflect the actual battery discharge rate over a longer period of time, such existing systems may also be very inaccurate.

Further, some existing system offer no functionality for automatically and gracefully attempting to preserve battery life. Such existing systems may offer a user the option to navigate power settings in an attempt to enable some form of low-power mode. Such existing systems, however, are not user friendly and not personalized to the user.

SUMMARY

Embodiments of the disclosure preserve device battery life based on usage patterns. An amount of battery drain and an execution context is determined for a computing device during one of a plurality of recurring time periods. The execution context identifies one or more operations executed by the computing device during the recurring time period. An expected execution of at least one of the operations during a recurrence of the recurring time period is identified. The identified, expected execution is adjusted based on the determined execution context and an estimated remaining battery life for the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable battery preservation based on user-specific usage patterns record during a plurality of time periods. Aspects of the disclosure enable the computing device 102 to automatically detect when battery life reaches a particular threshold and to automatically enable battery preservation operations as described herein. As a result, the user 104 is able to continue to use the computing device 102 for an extended time. When the computing device 102 is recharged (e.g., above a threshold level), the battery preservation operations are automatically suspended. In some embodiments, the user 104 is able to explicitly enable the battery preservation operations to maximize battery life (e.g., during an emergency, or during travel).

Aspects of the disclosure further calculate an estimated remaining battery life specific to the user 104 based on previous discharge data for the user 104 over time. The previous discharge data is stored in battery records 112, as illustrated and described herein.

Figure 1:
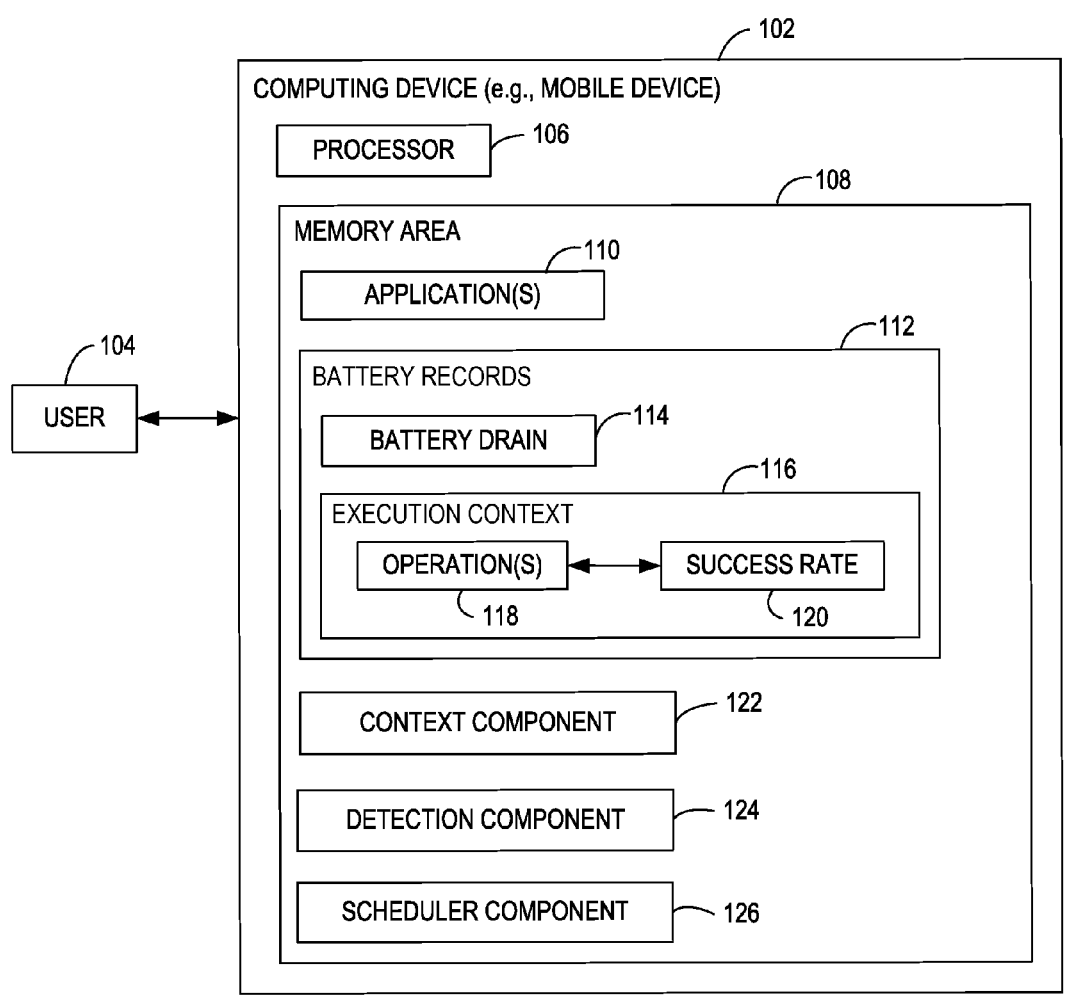
FIG. 1 is an exemplary block diagram illustrating a computing device storing battery records and computer-executable components for preserving battery life based thereon.

Referring next to FIG. 1, an exemplary block diagram illustrates the computing device 102 storing the battery records 112 and computer-executable components for preserving battery life based thereon. In the example of FIG. 1, the computing device 102 is associated with the user 104 and represents a system for preserving device battery life based on usage patterns. The computing device 102 represents any device executing instructions (e.g., as application programs, operating system functionality, or both) to implement the operations and functionality associated with the computing device 102. The computing device 102 may include a mobile computing device or any other portable device. In some embodiments, the mobile computing device includes a mobile telephone, laptop, tablet, computing pad, netbook, gaming device, and/or portable media player. The computing device 102 may also include less portable devices such as desktop personal computers, kiosks, and tabletop devices. Additionally, the computing device 102 may represent a group of processing units or other computing devices.

The computing device 102 has at least one processor 106 and a memory area 108. The processor 106 includes any quantity of processing units, and is programmed to execute computer-executable instructions for implementing aspects of the disclosure. The instructions may be performed by the processor 106 or by multiple processors executing within the computing device 102, or performed by a processor external to the computing device 102. In some embodiments, the processor 106 is programmed to execute instructions such as those illustrated in the figures (e.g., FIG. 2, FIG. 3, FIG. 4, FIG. 6, and FIG. 7).

The computing device 102 further has one or more computer readable media such as the memory area 108. The memory area 108 includes any quantity of media associated with or accessible by the computing device 102. The memory area 108 may be internal to the computing device 102 (as shown in FIG. 1), external to the computing device 102 (not shown), or both (not shown). For example, the memory area 108 may represent cloud storage.

The memory area 108 stores, among other data, one or more applications 110. The applications 110, when executed by the processor 106, operate to perform functionality on the computing device 102. Exemplary applications 110 include mail application programs, web browsers, calendar application programs, address book application programs, messaging programs, media applications, location-based services, search programs, and the like. The applications 110 may communicate with counterpart applications or services such as web services accessible via a network. For example, the applications 110 may represent downloaded client-side applications that correspond to server-side services executing in a cloud.

Execution of the applications 110 includes execution or performance of one or more operations 118 by the processor 106. Execution of each of the operations 118 consumes battery power, as described herein.

The memory area 108 further stores one or more battery records 112. As described herein, the memory area 108 may represent cloud storage. Each of the battery records 112 is associated with one of a plurality of recurring time periods. In some embodiments, each of the battery records 112 includes an amount of battery drain 114 (or a battery drain rate) and a corresponding execution context 116 for the computing device 102 during the associated time period. In some embodiments, the execution context 116 identifies one or more operations 118 executed by the computing device 102 during the associated time period. The execution context 116 further identifies a success rate 120 and/or failure rate associated with each of the operations 118. In some embodiments, the success rate 120 corresponds to signal strength. For example, a stronger signal strength may correspond to a higher success rate 120. The battery records 112 may also accumulate activity quantity and values. Each battery record 112 may be a single record storing the accumulated data, or may represent a plurality of statistical records. Exemplary records may further define, or be used to calculate, one or more of the following relating to battery drain: a quantity of samples, a minimum, a maximum, a mean, a median, a standard deviation, a coefficient of variance, a confidence factor, and a rolling factor. In some embodiments, the battery drain 114 stored in one of the battery records 112 is a linear approximation of the discharge rate observed during the time period associated with the battery record 112.

In general, the battery records 112 are abstract and include values that are correlated to an activity or situation (e.g., one or more of the operations 118). The battery records 112 may be used by a battery management system and/or activity scheduler to produce estimates and make decisions (e.g., battery savings decisions and/or battery life estimates).

One or more of the battery records 112 are associated with one of the recurring time periods to allow the computing device 102 to select the battery records 112 relevant to a particular time to make a decision regarding power conservation. The recurring time periods may be defined by dividing each day of the week into N periods, where N is a positive integer. A greater N increases the accuracy of the battery records 112 as the linear approximation of the discharge rate is more realistic, but decreases the chances of the battery record 112 converging to a true mean. Similarly, a smaller N reduces accuracy as the linear approximation becomes less real, but increases the chances of the battery record 112 converging to a true mean. The duration of the time period may be fixed or dynamic per device type, model, operating system version, etc.

In some embodiments, each of the recurring time periods is a three-hour segment or window. As such, there are eight records per day. Further, the records may be combined to create record sets on a daily or weekly basis. For example, there may be nine record sets per week: one for each day of the week, one to represent all workdays, and one to represent all weekend days. However, aspects of the disclosure are operable with any duration of recurring time periods (e.g., "N" hour segments).

As an example, one of the records may indicate that on Monday between 7 am and 8 am, the user 104 fails to synchronize email 90% of the time. Another record may indicate that on Monday between 7 am and 8 am, the battery drain rate is 3.5% per hour. Another record may indicate that on Saturday between 7 pm and 10 pm, the user 104 receives ten emails per hour. Using this information, aspects of the disclosure operate to automatically adjust execution of operations 118 to save battery, and estimate the battery life for this specific user 104 according to what they do regularly.

The memory area 108 further stores one or more computer-executable components. Exemplary components include a context component 122, a detection component 124, and a scheduler component 126. Execution of the components is described below with reference to FIG. 2.

Figure 2:
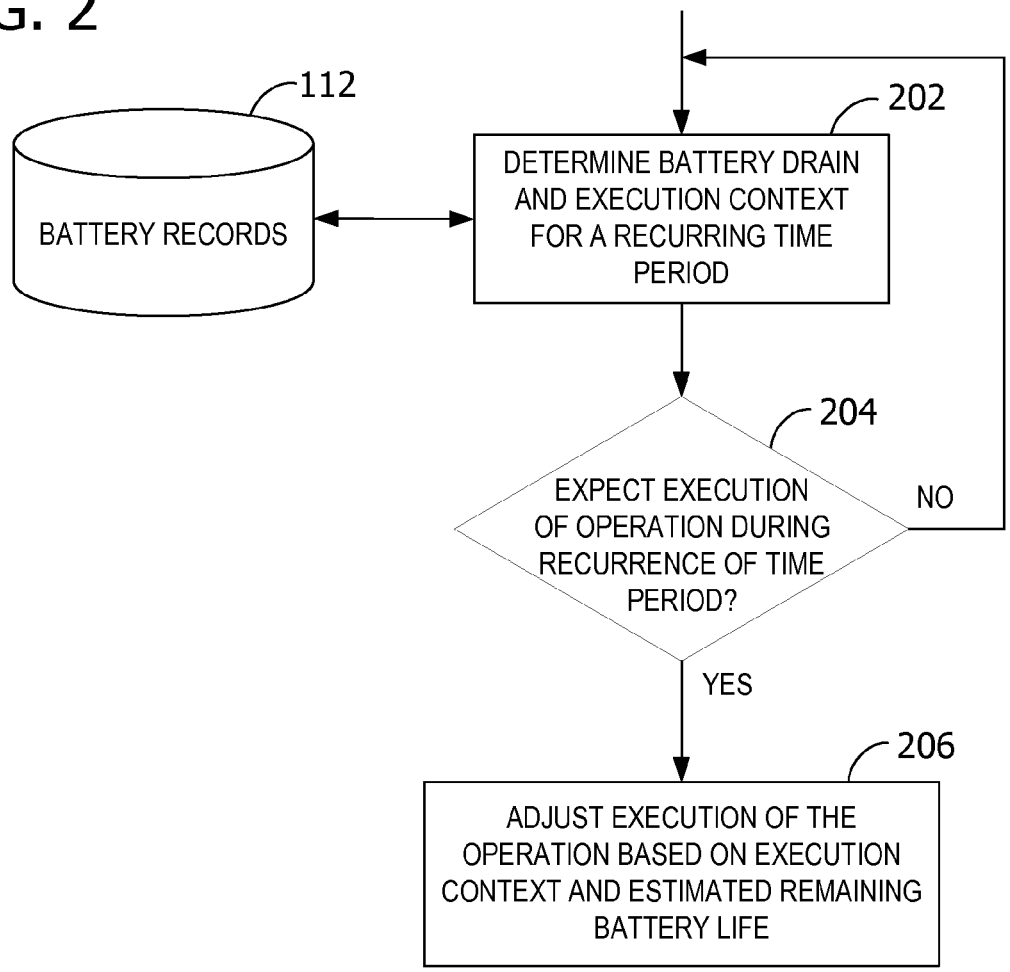
FIG. 2 is an exemplary flow chart illustrating operation of the computing device to adjust execution of operations based on remaining battery life and expected battery drain.

Referring next to FIG. 2, an exemplary flow chart illustrates operation of the computing device 102 to adjust execution of operations 118 based on remaining battery life and expected battery drain. The operations illustrated in FIG. 2 may be performed by the computing device 102 such as a mobile computing device (e.g., mobile telephone). In other embodiments, one or more of the operations are performed by a device separate from the computing device 102. For example, the operations may be performed by a cloud service, and then instructions regarding rescheduling or suppressing execution of operations 118 to preserve battery life on the computing device 102 may be sent from the cloud service to the computing device 102.

At 202, the computing device 102 determines an amount of battery drain 114 and the execution context 116 for the computing device 102 during one of a plurality of recurring time periods. In some embodiments, the computing device 102 accesses the battery records 112 to determine the amount of battery drain 114 and the execution context 116. The battery records 112 may be stored by the computing device 102 or otherwise associated with the computing device 102. In other embodiments, the battery records 112 are stored remote from the computing device 102 (e.g., via cloud storage).

The execution context 116 identifies one or more operations 118 executed by the computing device 102 during the recurring time periods. The execution context 116 may also identify one or more of the following: average battery drain, success rate 120 of the executed operations 118, a network traffic quantity, and network traffic congestion. In some embodiments, the battery drain 114 and execution context 116 represent a usage pattern of the user 104.

If the computing device 102 identifies at 204 an expected execution of at least one of the operations 118 during a later time period (e.g., a recurrence of one of the recurring time periods), the computing device 102 considers at 206 whether to adjust execution of the operation 118 based on the execution context 116 and the estimated remaining battery life of the computing device 102. For example, the computing device 102 may suppress or reschedule execution of the operation 118 to conserve the estimated remaining battery life. In some embodiments, the computing device 102 adjusts the identified, expected execution of the operation 118 based on an estimated remaining battery life for the computing device 102 and based on the success rate 120 of the operation 118 from the battery record 112 associated with the recurring time period. If there is a low chance of successfully executing the operation 118 during the recurring time period, the computing device 102 suppresses or delays execution of the operation 118. If there is a high chance of successfully executing the operation 118 during the recurring time period, the computing device 102 proceeds to execute the operation 118 during the recurring time period.

The memory area 108 of the computing device 102 may further store one or more pre-defined thresholds (not shown). The pre-defined thresholds represent criteria for use by the computing device 102 to determine whether and how to adjust the expected execution of the operation 118. The pre-defined thresholds may include a percentage value, an absolute value, or a relative value. For example, the computing device 102 adjusts the expected execution of the operation 118 by suppressing the execution if the success rate 120 associated with the operation 118 is less than the pre-defined threshold. Alternatively or in addition, if the success rate 120 of the operation 118 is less than the pre-defined threshold, the computing device 102 may adjust the expected execution of the operation 118 by identifying another one of the recurring time period during which the success rate 120 of the operation 118 is greater than the pre-defined threshold. The computing device 102 then reschedules the execution for this other recurring time period to give the operation 118 a greater chance of success.

In some embodiments, the computing device 102 defines the battery records 112, at least one for each of the plurality of recurring time periods based on observed and/or measured usage. The computing device 102 may analyze the battery records 112 to infer power statistics. For example, the computing device 102 may identify operations 118 or applications 110 that consume significant battery power, may predict battery drain for the computing device 102 over a particular time period, and/or may identify time periods during which power consumption is low. The computing device 102 may predict the battery drain, or estimate the likelihood of continuing to be powered on, by estimating, based on the battery records 112, the remaining battery life for the computing device 102.

Additionally, the computing device 102 may analyze the battery records 112 to calculate how much power a particular operation will consume. In some embodiments, real-time and usage benchmarking of power consumption may be produced based on the battery records 112 to create a power consumption profile or signature. For example, the power consumption profile for the computing device 102 and/or operating system executing thereon may be used for marketing purposes such as to identify the device with the best battery life for playing games, or for social networking updates, for placing calls, etc. Additionally, the power consumption profile for an application may be used to identify and resolve power consumption issues with the application (e.g., identify to a vendor that a particular application is consuming too much power).

Further, when the battery records 112 are stored in cloud storage, the battery records 112 may be analyzed to produce profiles that are common across users 104, population segments, or geographical areas, for example. The profiles may also be used to build pre-calculated estimations and target particular users 104 with particular optimizations. The users 104 may be targeted by default when the users 104 buy the computing device 102, or when aspects of the disclosure determine or infer that the users 104 fit a particular profile.

The computing device 102 may further analyze the battery records 112 to identify one or more of the operations 118 having the amount of battery drain exceeding a pre-defined threshold, and to identify one or more of the recurring time periods having the success rate 120 exceeding the pre-defined threshold.

In embodiments in which a rolling average of battery drain is maintained (e.g., stored in the battery records 112 or otherwise calculated) by the computing device 102, the computing device 102 predicts the battery drain for the computing device 102 during the recurrence of one of the plurality of recurring time periods based on the calculated rolling average of battery drain. Alternatively or in addition, the computing device 102 may predict when to charge the computing device 102 based on the calculated rolling average of battery drain.

In some embodiments, the components illustrated in FIG. 1 execute to perform one or more of the operations illustrated in FIG. 2. For example, the context component 122, when executed by the processor 106, causes the processor 106 to determine, for the computing device 102 during one of a plurality of recurring time periods, an amount of battery drain 114. The context component 122 further determines one or more operations 118 executed by the computing device 102 during the recurring time period along with a success rate 120 corresponding to each of the operations 118 performed by the computing device 102 during the time period. The context component 122 may also identify at least one of the plurality of recurring time periods during which the computing device 102 is charged (e.g., the user 104 provides an external power source to the computing device 102). The context component 122 calculates the estimated remaining battery life, and notifies the user 104 if the calculated, estimated remaining battery life is insufficient to last until the next expected charging cycle (e.g., a recurrence of the recurring time period) or until the end of the user's day.

The detection component 124, when executed by the processor 106, causes the processor 106 to identify an expected execution of at least one of the operations 118 during a recurrence of the recurring time period. The scheduler component 126, when executed by the processor 106, causes the processor 106 to adjust the identified, expected execution based on an estimated remaining battery life for the computing device 102 and based on the success rate 120 of the operation 118 during the recurring time period.

Figure 3:
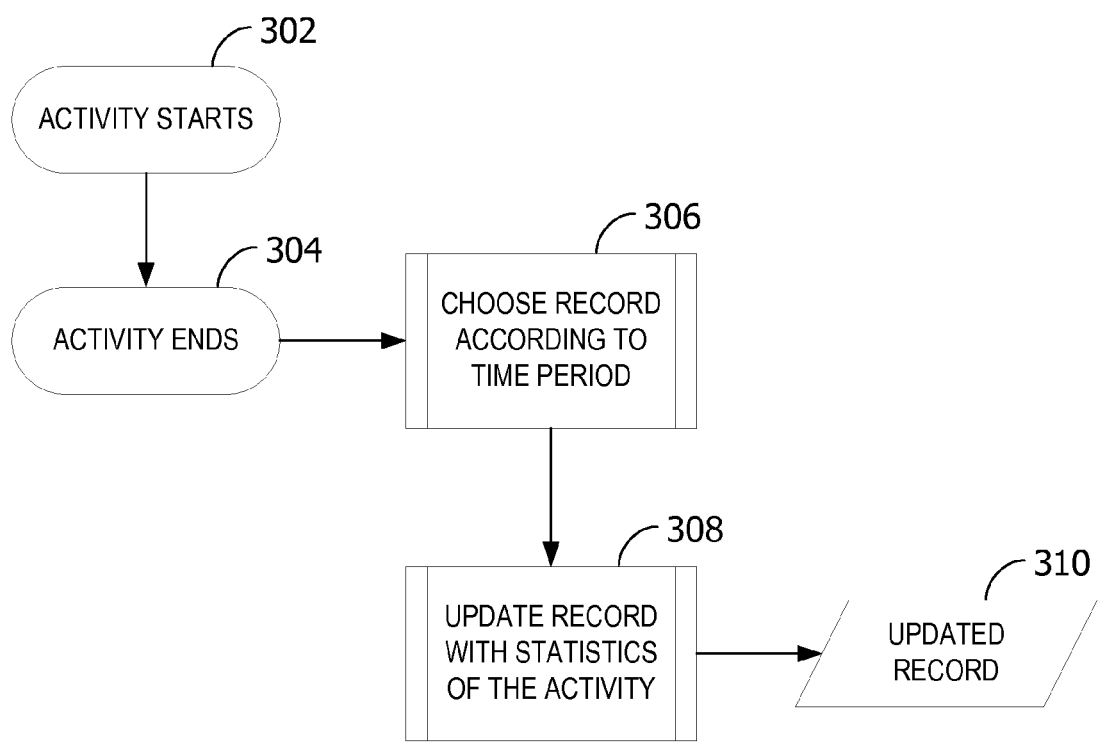
FIG. 3 is an exemplary flow chart illustrating operation of the computing device to update the battery records based on execution activity of the computing device.

Referring next to FIG. 3, an exemplary flow chart illustrates operation of the computing device 102 to update the battery records 112 based on execution activity of the computing device 102. An activity starts at 302 and ends at 304. The activity includes any operation performed by the computing device 102. In embodiments in which the computing device 102 is a mobile computing device, exemplary activities include, but are not limited to, telephone calls, playing games, audio playback, and video playback.

The computing device 102 selects the battery record 112 for storing statistics relating to the activity at 306. The statistics represent, for example, any usage and environment information related to the period of time during which the activity occurred. Exemplary statistics include, among other data, a discharge slope of the available battery, signal strength, connectivity, network congestion, and/or success/failure rates for battery intensive operations. The battery record 112 is selected based on the time period during which the activity occurred. At 308, the selected battery record 112 is updated with the statistics. The updated battery record 112 is stored at 310. The battery records 112, collectively, represent a usage pattern for the user 104 for the time period.

Figure 4:
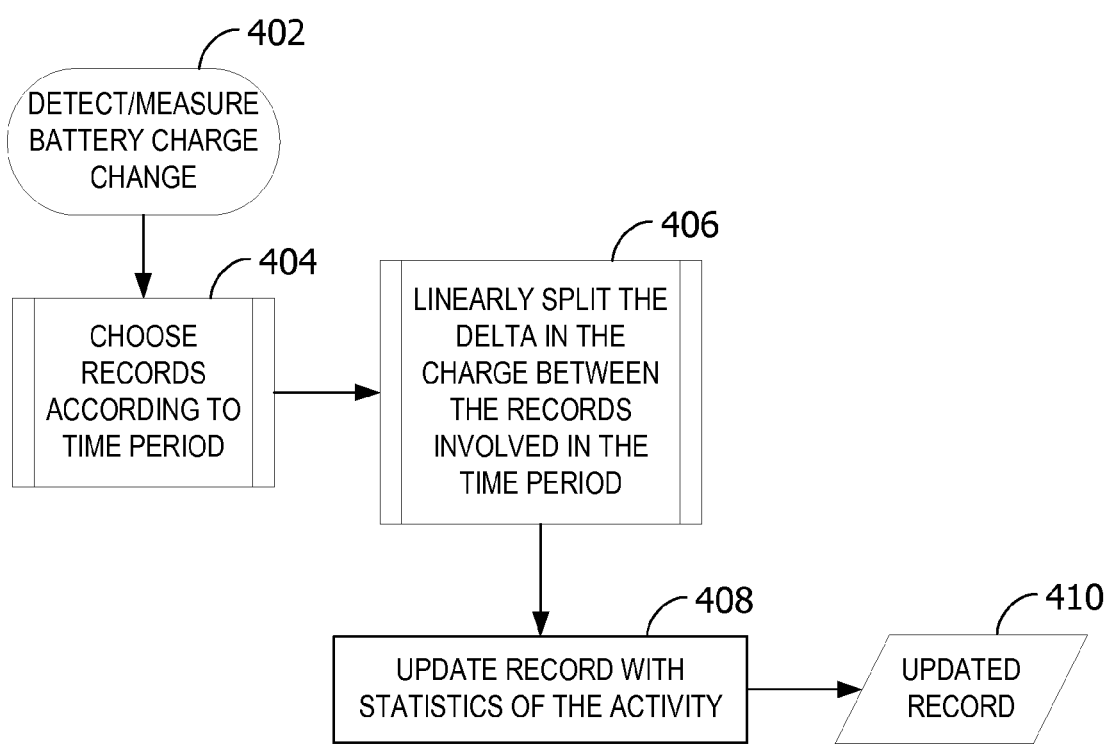
FIG. 4 is an exemplary flow chart illustrating operation of the computing device to update battery records based on a change in the charge of the battery.

Referring next to FIG. 4, an exemplary flow chart illustrates operation of the computing device 102 to update battery records 112 based on a change in the charge of the battery. At 402, the computing device 102 detects or measures a change in the charge of the battery. For example, the charge may decrease based on an activity performed by the computing device 102. At 404, the computing device 102 selects the records corresponding to the time period associated with the detection or measurement. The computing device 102 applies the charge change to the selected records by linearly splitting the change (e.g., delta) in battery charge across the selected records at 406. The selected records are updated with the applied charge at 408, and stored at 410.

Table 1 below illustrates how discharge measurements are applied to the battery records 112 corresponding to the time periods associated with the discharge. In Table 1, the time periods are one hour, but aspects of the disclosure contemplate other intervals as well (e.g., three hours).

TABLE 1

Exemplary Battery Discharge Applied to Hour of Day.

| Minute of Day | Hour of Day | Percentage of Battery | Delta | Attribution |
|---|---|---|---|---|
| 862 | 14.37 | 99 | 0 | 14: 0.00% |
| 872 | 14.53 | 98 | 10 | 14: 1.00% |
| 887 | 14.78 | 97 | 15 | 14: 1.00% |
| 897 | 14.95 | 96 | 10 | 14: 1.00% |
| 917 | 15.28 | 95 | 20 | 14: 0.15%,, 15: 0.85% |
| 942 | 15.70 | 94 | 25 | 15: 1.00% |
| 952 | 15.87 | 93 | 10 | 15: 1.00% |
| 967 | 16.12 | 92 | 15 | 15: 0.53%, 16: 0.47% |
| 987 | 16.45 | 91 | 20 | 16: 1.00% |
| 1007 | 16.78 | 90 | 20 | 16: 1.00% |

As shown in Table 1, the discharge distribution is 3.15% for the 14$^{th}$ hour, 3.38% for the 15$^{th}$ hour, and 2.47% for the 16$^{th}$ hour. A rolling average may be calculated for the values obtained for each hour on the appropriate day of the week. This information is later used to estimate if the user 104 will be able to reach the end of the day without running out of battery charge.

Similarly, signal strength ordered by time period may be stored in the battery records 112. The fluctuation in signal strength during the day may be represented similar to how the discharge rates are represented (e.g., Table 1 above). The computing device 102 is then able to align synchronization schedules and perform other communication tasks at times when the signal strength is expected to be strong (e.g., the tasks are expected to complete successfully without repeated attempts that drain the battery).

The flow chart in FIG. 4 illustrates one detection or measurement in battery charge. The following example in FIG. 5 illustrates a full discharge cycle.

Figure 5:
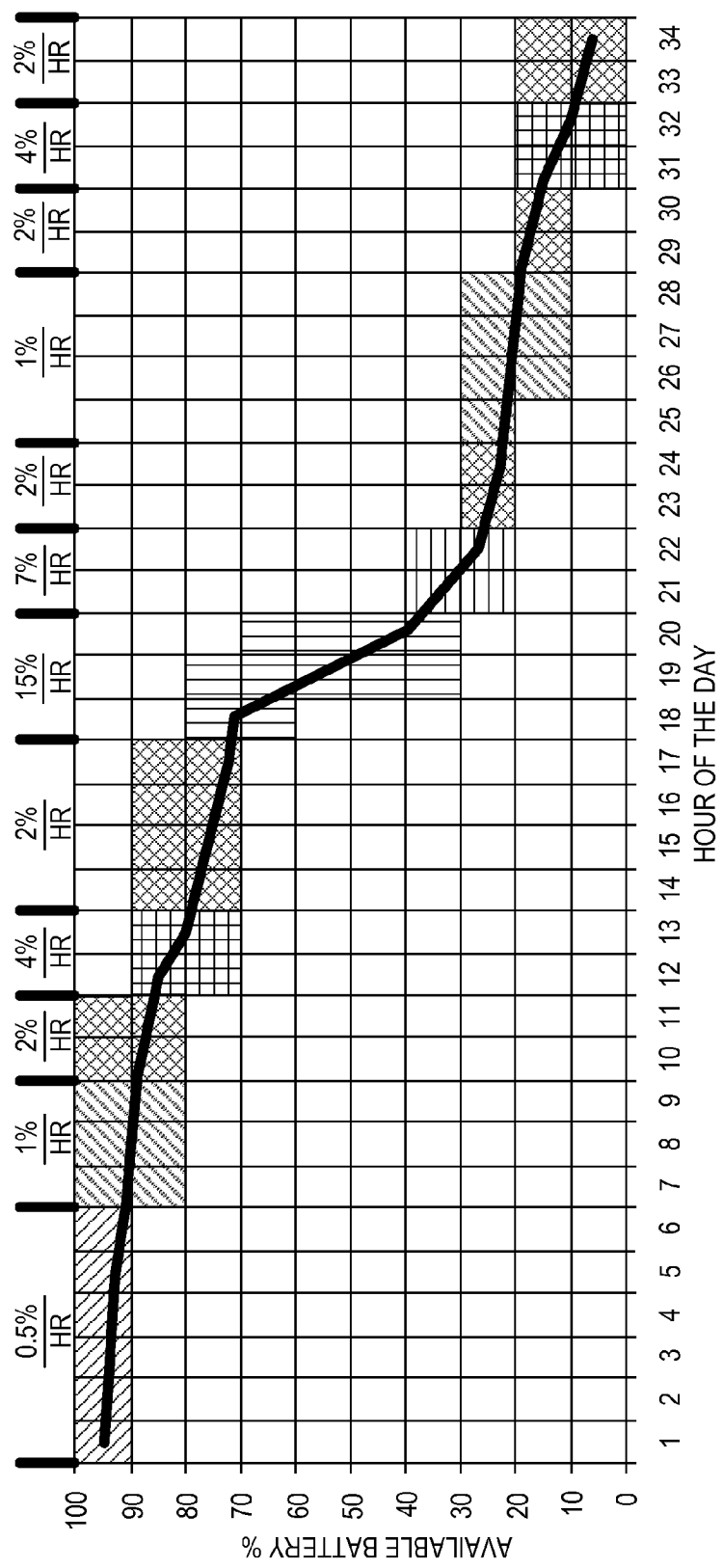
FIG. 5 is an exemplary graph illustrating battery discharge on the computing device.

Referring next to FIG. 5, an exemplary graph illustrates battery discharge on the computing device 102. The example of FIG. 5 illustrates exemplary discharge over the course of a day and a half. The discharge cycle is split into slope variations that are recorded and stored by the battery records 112 corresponding to the time period of the discharge. In the example of FIG. 5, the slope variations are represented in percent per hour. Other units, however, are contemplated by the disclosure. For example, for additional granularity, the slope variations may be represented in percent per minute. Further, instead of identifying a percentage discharge, the rate may be represented by absolute values or relative values (e.g., power units or current units). Because percentage discharge depends on battery size, dependency on battery size may be eliminated in embodiments using power units to enable comparisons across devices.

Figure 6:
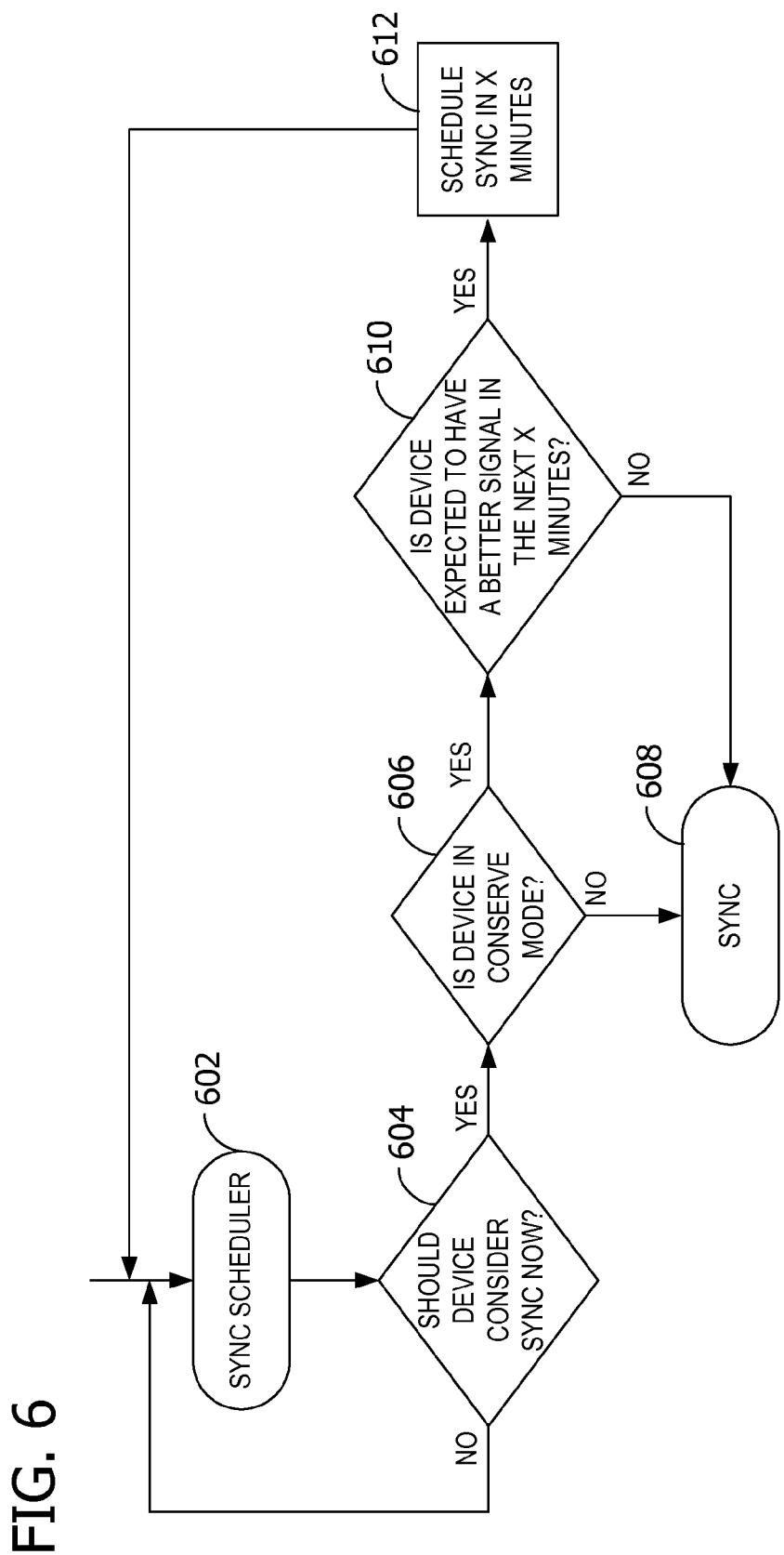
FIG. 6 is an exemplary flow chart illustrating operation of a scheduler for battery-conscious synchronization of data.

The battery records 112 may be processed or analyzed to obtain statistical information about battery discharge on average on a particular day around a particular set of hours. The computing device 102 is then able to forecast battery life, identify charging/discharging patterns, and best/worst case approximations for battery savings). In the example of FIG. 6, next described, the computing device 102 accesses the battery records 112 to determine whether to synchronize data.

Referring next to FIG. 6, an exemplary flow chart illustrates operation of a sync scheduler 602 for battery-conscious synchronization of data. The sync scheduler 602 represents logic on the computing device 102 for synchronizing data such as electronic mail messages, calendar information, and social activity data. At 604, the computing device 102 determines whether to consider synchronizing data. For example, an event such as the elapsing of an interval (e.g., synchronize every two minutes) may trigger the computing device 102 to consider synchronization. If the computing device 102 concludes that synchronization should be attempted, then the computing device 102 checks whether it is in conserve mode (e.g., whether the battery preservation operations are enabled) at 606. If the computing device 102 is not in conserve mode, the computing device 102 proceeds to perform the synchronization at 608.

If the computing device 102 is in conserve mode, the computing device 102 analyzes the battery records 112 to determine at 610 whether the computing device 102 is expected to have a better signal in the next X minutes, where X is a value representing a quantity of minutes. The computing device 102 makes the determination at 610 based on statistics or another analysis of the battery records 112. For example, the computing device 102 may analyze the success rate 120 of previous synchronization attempts during a previous occurrence of the present time period. By considering the likelihood of successfully completing a synchronization at the present time, the computing device 102 is able to determine whether to perform the synchronization now or postpone the synchronization until a later time. For example, the computing device 102 may schedule the synchronization for X minutes later at 612.

Figure 7:
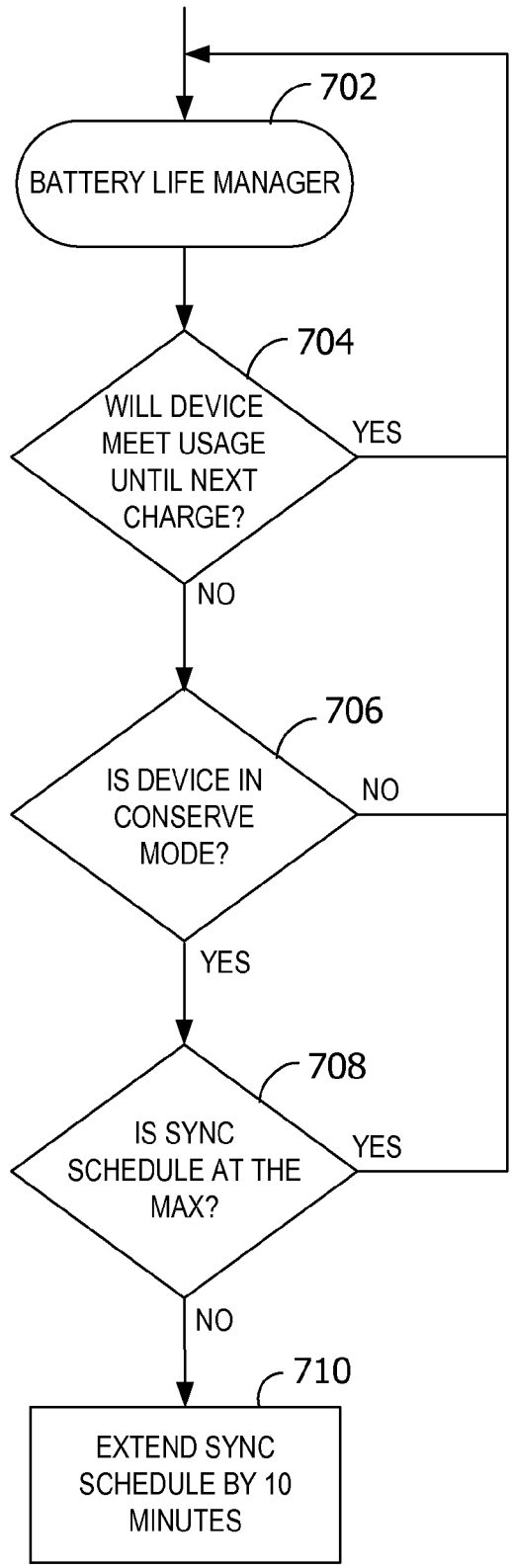
FIG. 7 is an exemplary flow chart illustrating operation of a battery life manager for preserving battery life by postponing data synchronization.

While FIG. 6 illustrates exemplary operation of the sync scheduler 602 for determining whether to synchronize data based on the information stored in the battery records 112, the following example illustrated in FIG. 7 illustrates use of the battery records 112 for preserving battery life.

Referring next to FIG. 7, an exemplary flow chart illustrates operation of a battery life manager 702 for preserving battery life by postponing data synchronization. In some embodiments, the sync scheduler 602 illustrated in FIG. 6 and the battery life manager 702 illustrated in FIG. 7 may be part of the same component for implementing the battery preservation operations. At 704, the battery life manager 702 determines the likelihood of the computing device 102 being able to meet the expected discharge until the next expected charge cycle. For example, the battery life manager 702 accesses the battery records 112 to determine when the user 104 typically charges the computing device 102. The battery life manager 702 further estimates the remaining battery life of the computing device 102 based on the historical, typical, and/or expected discharge between the present time and the expected time of the next charge cycle.

If the computing device 102 determines that the battery will be able to meet the expected usage until the next expected charge at 704 and that the computing device 102 is in conserve mode at 706. Conserve mode indicates that the battery preservation operations are enabled, either through user authorization or because the battery level has reached a particular threshold (e.g., 20% remaining), for example. If the computing device 102 is not in conserve mode, no change is made to the synchronization schedule. If the computing device 102 is in conserve mode, the battery life manager 702 determines whether the current synchronization schedule is at a maximum at 708. The maximum indicates, for example, that the synchronization schedule has been extended or postponed previously and now exceeds a pre-defined threshold for extensions. If the synchronization schedule is not at a maximum, the battery life manager 702 extends synchronization schedule or otherwise postpones the time for synchronization for a period of time such as ten minutes at 710.

Figure 8:
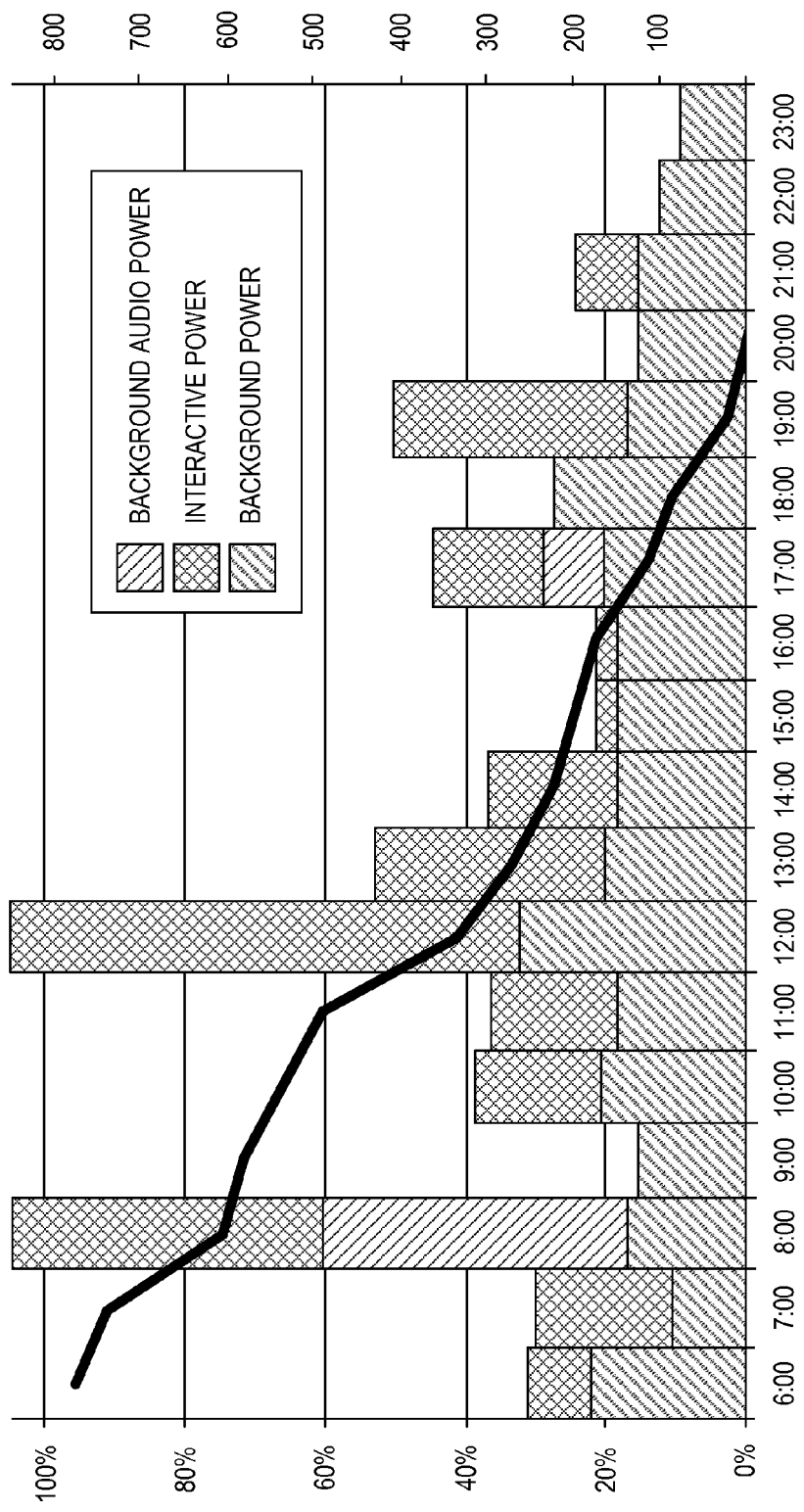
FIG. 8 is an exemplary graph illustrating a sample battery discharge without performing battery preservation operations.

Referring next to FIG. 8, an exemplary graph illustrates a sample battery discharge without performing battery preservation operations illustrated in FIG. 2 and described herein. In the example of FIG. 8, an exemplary mobile computing device executing typical operations 118 discharges the battery according to the line in the graph, and the battery appears to last about 15 hours.

Figure 9:
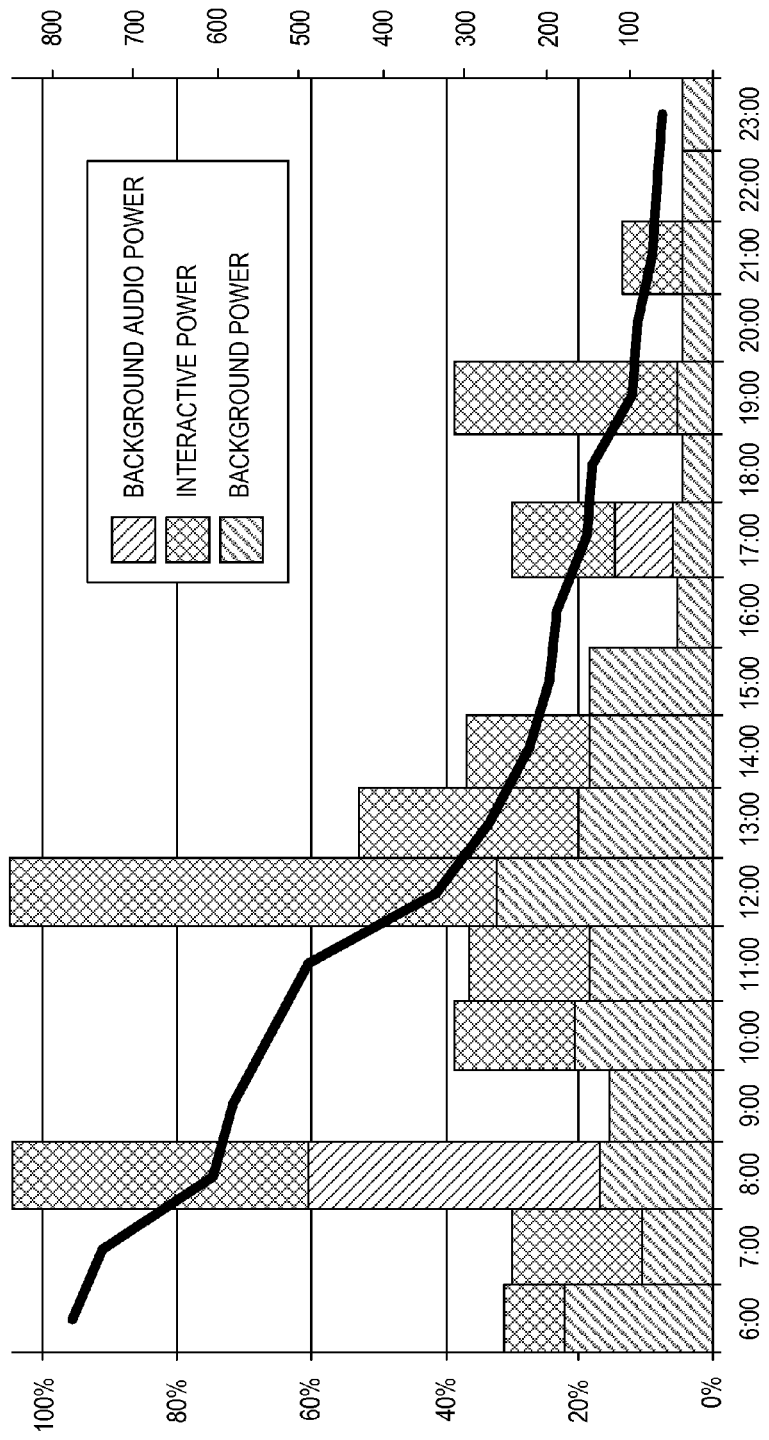
FIG. 9 is an exemplary graph illustrating a sample battery discharge when performing the battery preservation operations.

Referring next to FIG. 9, an exemplary graph illustrates a sample battery discharge when performing the battery preservation operations illustrated in FIG. 2 and described herein. In the example of FIG. 9, the exemplary mobile computing device used to create the graph in FIG. 8 executes the same typical operations 118 used to create the graph in FIG. 8 to discharge the battery. In the example of FIG. 9, however, the mobile computing device implements the battery preservation operations illustrated in FIG. 2 when the battery level reaches about 20%. The mobile computing device implements the battery preservation options without explicit user input, or otherwise automatically. In this example, the battery life is extended to about 29 hours, which represents a significant improvement of battery life. At the 20% battery level, once the battery preservation operations commence execution, the user 104 may or may not notice that certain operations 118 are suppressed or rescheduled (e.g., emails stop being received automatically). Overall, the user experience is enhanced through operation of the present disclosure.

Figure 10:
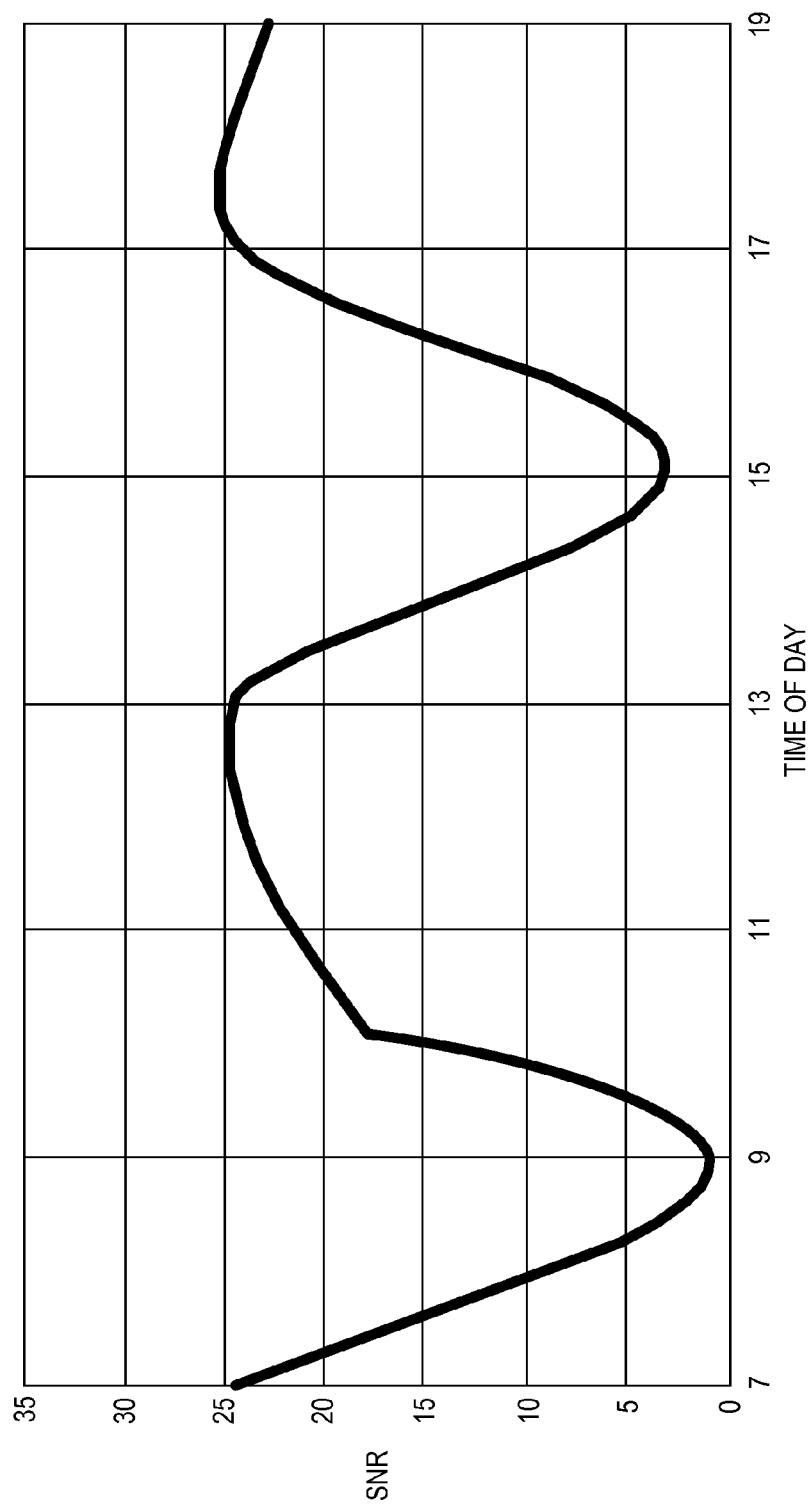
FIG. 10 is an exemplary graph illustrating signal-to-noise ratio values plotted against time of day.

Referring next to FIG. 10, an exemplary graph illustrates signal-to-noise ratio values plotted against time of day. The graph visualizes a success rate record across time by plotting a record set that refers to N time periods correlated with success rates.

ADDITIONAL EXAMPLES

In an example scenario, the computing device 102 identifies a repeatable pattern based on signal strength and synchronization retry success rates 120 over time to save the battery. For example, if at 8:45 am the computing device 102 is scheduled to synchronize, but the computing device 102 determines, based on the battery records 112, that the signal strength will be, on average, 25% higher in five minutes, the computing device 102 postpone synchronization for five minutes. In another example, if the computing device 102 fails to synchronize at a particular time, the computing device 102 accesses the battery records 112 to determine whether the success rate 120 at the current time is low enough to warrant postponing a retry to avoid wasting battery life.

In another example scenario, the computing device 102 identifies a repeatable pattern based on charging habits to optimize power usage. In an example, the user 104 typically discharges the computing device 102 for 12 hours before plugging in the computing device 102 for a recharge. The computing device 102 automatically implements or otherwise enables the battery preservation operations described herein to stretch the estimated remaining battery life to reach 12 hours. Conversely, if the computing device 102 expects, based on the battery records 112, that a charge is expected within the next three hours and that the estimated remaining battery life, based on the battery records 112, is eight hours, the computing device 102 may disable or scale back execution of the battery preservation operations. For example, the computing device 102 may synchronize data on a normal schedule, allow real-time messaging, or otherwise perform battery intensive operations unrestricted.

In another example scenario, the computing device 102 identifies repeatable patterns on the discharge rates from the battery records 112 to allow estimates of remaining battery life. For example, to estimate the remaining battery life, the computing device 102 obtains the currently available charge and iterates through the stored discharge rates in the battery records 112 starting with the battery record 112 corresponding to the current time (e.g., if it is 3 pm now, the computing device 102 starts with the battery record 112 including 3 pm). The computing device 102 subtracts the stored, historical discharge rate for each of the time periods from the currently available charge until the resulting battery charge is zero. The computing device 102 identifies the time period, or estimated time, during which the resulting battery charge changed to zero and identifies this time to the user 104.

When selecting the battery records 112 to estimate the remaining battery life, the computing device 102 accesses day-specific battery records 112. For example, if the current time is 3 pm on a Tuesday, the computing device 102 accesses the Tuesday battery records 112. The computing device 102 may further access day-type battery records 112 such as weekday versus weekend to enable convergence on the closest estimate possible for the hours that the user 104 performs predictable behavior, while using generic estimations for the hours that the user 104 is less predictable.

Table 2 below illustrates how the computing device 102 iterates through the battery records 112 to estimate the remaining battery life. While the values in Table 2 reflect averages, other statistics such as worst case or best case values may be employed. In Table 2, the computing device 102 receives a request for an estimate of the remaining battery life from the user 104 at noon on Monday (e.g., the fifth period of the day when the time periods are three hours). At the time of the request, the computing device 102 has 30% battery remaining

TABLE 2

Estimated Remaining Battery Life Based on Battery Records.

| Day | Period | Recorded Discharge | Remaining battery | Estimate |
|---|---|---|---|---|
| Monday | 5 | 1.50% | 28.50% | 3 hours |
| Monday | 6 | 2.00% | 26.50% | 6 hours |
| Monday | 7 | 1.00% | 25.50% | 9 hours |
| Monday | 8 | 4.00% | 21.50% | 12 hours |
| Tuesday | 1 | 3.00% | 18.50% | 15 hours |
| Tuesday | 2 | 3.00% | 15.50% | 18 hours |
| Tuesday | 3 | 2.00% | 13.50% | 21 hours |
| Tuesday | 4 | 9.00% | 4.50% | 24 hours |
| Tuesday | 5 | 3.00% | 1.50% | 27 hours |
| Tuesday | 6 | 2.00% | 0.00% | 29.25 hours |

Based on the information recorded in the selected battery records 112, the estimated remaining battery life is 29.25 hours.

In another example scenario, the estimated remaining battery life is calculated based on an adjusted, average discharge rate of the current discharge cycle. For example, the average discharge rate may be averaged with the discharge rate between the last discrete discharge data point and the current state. The resulting estimate rate is used to divide the current available battery percentage to produce an estimated amount of time remaining Equations (1), (2), (3), and (4) below illustrate this example scenario.

$$R = \frac{\Delta P}{\Delta T} \quad (1)$$

$$r = \frac{\Delta p}{\Delta t} \quad (2)$$

$$Er = \frac{R+r}{2} \quad (3)$$

$$Et = \frac{P}{Er} \quad (4)$$

In Equations (1), (2), (3), and (4) above, $\Delta P$ represents the available percentage delta since started discharging, $\Delta T$ represents the time delta since started discharging, $\Delta p$ represents the available percentage delta since the last data point, $\Delta t$ represents the time delta since the last data point, R represents the average discharge rate, r represents the adjusted discharge rate, Er represents the resulting estimate rate, and Et represents the resulting time estimate.

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in the flowcharts may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 104. In such embodiments, notice is provided to the users 104 of the collection of the data (e.g., via a dialog box or preference setting) and users 104 are given the opportunity to give or deny consent for the monitoring and/or collection. The consent may take the form of opt-in consent or opt-out consent.

For example, the user 104 may opt to enable or disable the functionality associated with the present disclosure. The user 104 may enable the functionality explicitly by configuring a setting on the computing device 102. In some embodiments, the user 104 is able to set when the functionality is enabled (e.g., at 20% battery life remaining, 10% battery life remaining, etc.).

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Computer storage media exclude propagated data signals. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for analyzing the defined battery records 112 to identify battery usage patterns.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for updating battery records associated with a computing device, said system comprising:
   a memory area associated with the computing device, said memory area storing a plurality of battery records each associated with one of a plurality of recurring time periods, each of the plurality of battery records including an amount of battery drain and a corresponding execution context for the computing device during the associated time period, said execution context identifying one or more operations executed by the computing device during the associated time period; and
   a processor programmed to:
      detect a start of an execution activity and an end of the execution activity to identify one of the plurality of recurring time periods;
      determine data usage statistics relating to the identified time period;
      select one or more battery records from the plurality of battery records to store the determined data usage statistics, the one or more battery records being selected based on the identified time period; and
      update each of the selected one or more battery records with the determined data usage statistics, wherein the updated battery records represent a usage pattern for use when estimating and preserving battery life.

2. The system of claim 1, wherein the processor is further programmed to
   identify an expected execution of at least one of the operations during the identified time period; and
   automatically adjust the identified expected execution of the at least one of the operations based on an estimated remaining battery life for the computing device and the execution context.

3. The system of claim 2, wherein the estimated remaining battery life is calculated based on previous discharge data stored in the plurality of the battery records.

4. The system of claim 2, wherein the estimated remaining battery life is specific to a particular user and is calculated based on a regular activity of the particular user.

5. The system of claim 2, wherein the processor is programmed to adjust the identified expected execution of the operation by:
   determining if a success rate of the operation during the one of the plurality of recurring time periods is less than a pre-defined threshold;
   based on said determining, identifying another one of the plurality of recurring time periods during which a success rate of the operation is greater than the pre-defined threshold; and
   rescheduling the identified expected execution of the operation for said another one of the plurality of recurring time periods.

6. The system of claim 1, wherein the memory area represents cloud storage, and wherein the processor is programmed to predict the battery drain by estimating, based on the plurality of battery records stored in the cloud storage, a remaining battery life for the computing device.

7. The system of claim 1, wherein the battery drain stored in the selected one or more battery records represents a linear approximation of a battery discharge rate observed during the one of the plurality of recurring time periods.

8. The system of claim 1, wherein each of the recurring time periods is dynamic based on a type of the computing device.

9. The system of claim 1, wherein the processor is further programmed to calculate a rolling average of the battery drain based on the plurality of battery records stored in the memory area, and wherein the processor is further programmed to predict the battery drain for the computing device during the recurrence of the one of the plurality of recurring time periods based on the calculated rolling average of the battery drain.

10. The system of claim 1, wherein the processor is further programmed to analyze the plurality of battery records stored in the memory area to identify one or more of the operations having an amount of battery drain exceeding a pre-defined threshold.

11. The system of claim 1, wherein the processor is further programmed to analyze the plurality of battery records stored in the memory area to identify one or more of the recurring time periods during which the operations have a success rate exceeding a pre-defined threshold.

12. A method of updating battery records associated with a computing device, the method comprising
   detecting a change in a charge of a battery associated with the computing device;
   identifying an execution context upon detecting the change, wherein said identifying includes selecting battery records from a plurality of battery records, the selected battery records corresponding to a time period associated with detection of the change;
   assigning the change in the charge to the selected battery records; and
   updating each of the selected battery records with the assigned change in the charge, wherein the updated battery records represent a usage pattern for use when estimating and preserving battery life.

13. The method of claim 12, further comprising detecting when the charge is less than a pre-defined threshold and then automatically enabling battery preservation operations, wherein the battery preservation operations are automatically suspended when the charge is more than the pre-defined threshold.

14. The method of claim 13, further comprising accessing the plurality of battery records to determine when a user charges the computing device.

15. The method of claim 12, wherein one or more of the plurality of battery records are defined by the computing device for each of a plurality of recurring time periods, each of the one or more of the plurality of battery records including an amount of battery drain and a corresponding, execution context.

16. The method of claim 12, further comprising calculating power consumption for an operation based on the plurality of battery records to create a power consumption profile for the operation.

17. The method of claim 12, further comprising analyzing the plurality of battery records to produce power consumption profiles for a plurality of users or a plurality of geographical areas.

18. A computer storage media comprising computer executable instructions that when executed by a processor perform operations comprising:
   detecting, by a component executing on the computing device, a change in a charge of a battery;
   identifying, by a processor associated with the computing device, an execution context upon detecting the change, wherein identifying includes selecting battery records corresponding to a time period associated with the detection;

assigning the detected change in charge among the selected battery records; and updating each of the selected battery records with the assigned change in charge.

19. The computer storage media of claim 18, wherein the computer executable instructions, when executed by the processor, further perform operations comprising:

identifying at least one of a plurality of recurring time periods during which the computing device is charged;

calculating an estimated remaining battery life; and notifying a user of the computing device upon determining that the calculated, estimated remaining battery life is insufficient to last until a recurrence of said at least one of the plurality of recurring time periods.

20. The computer storage media of claim 18, wherein the computer executable instructions, when executed by the processor, further perform operations comprising determining a probability of the computing device being able to meet an expected discharge until a next expected charge cycle.

\* \* \* \* \*